United States Patent [19]

Schlesch

[11] Patent Number: 5,056,759
[45] Date of Patent: Oct. 15, 1991

[54] PROTECTED BELLOWS FOR VALVE

[75] Inventor: Ronald D. Schlesch, Three Rivers, Mich.

[73] Assignee: Armstrong International, Inc., Three Rivers, Mich.

[21] Appl. No.: 581,288

[22] Filed: Sep. 12, 1990

[51] Int. Cl.5 .............................. F16K 1/02; F16K 1/44; F16K 41/10

[52] U.S. Cl. .................................. 251/330; 251/267; 251/335.3; 277/200

[58] Field of Search ...................... 251/330, 335.3, 267; 277/200

[56] References Cited

U.S. PATENT DOCUMENTS

| 2,105,864 | 1/1938 | Saunders | 251/335.3 |
| 3,090,403 | 5/1963 | Kroekel | 138/121 |
| 3,206,165 | 9/1965 | Salmon et al. | 251/335.3 |
| 3,741,520 | 6/1973 | Richmond | 251/335.3 |
| 4,240,610 | 12/1980 | Trimble | 251/335.3 |
| 4,421,298 | 12/1983 | Kujawski | 251/335.3 |
| 4,872,639 | 10/1989 | Gernignani | 251/335.3 |

FOREIGN PATENT DOCUMENTS

| 568247 | 3/1924 | France | 251/335.3 |
| 778725 | 3/1935 | France | 251/335.3 |
| 986737 | 8/1951 | France | 251/335.3 |
| 1012047 | 7/1952 | France | 251/335.3 |

OTHER PUBLICATIONS

Sealol Bulletin HP12 "2200 Class Packless Valves", 4 pages Sealol Ball Valves, 6/1961, 1 page.
Eagle Packless Valves, Bulletin 2200, EG&G Sealol Eagle, 12 pages.

Primary Examiner—George L. Walton
Attorney, Agent, or Firm—Flynn, Thiel, Boutell, & Tanis

[57] ABSTRACT

A valve apparatus comprises a valve body having a fluid passage therein including a valve seat. A valve member, having a head and stem, is movable in the body between valve open and valve closed positions determined by the proximity of its head to the valve seat. The valve member is engageable in sealing relation with a portion of the valve body between the valve seat and a valve stem packing to block fluid in the passage from contacting and leaking between the valve stem and packing. This sealing relation also serves to protect a bellows, connected between the valve member and valve body, from contact with fluid in the fluid passage.

6 Claims, 4 Drawing Sheets

PROTECTED BELLOWS FOR VALVE

FIELD OF THE INVENTION

This invention relates to a valve apparatus equipped with a bellows.

BACKGROUND OF THE INVENTION

In a known valve apparatus, a valve member includes a head engagable with a seat in a valve body to shut off flow through the flow passage in the valve body. The valve member includes a stem which carries the head and is reciprocable with respect to the valve body. To prevent fluid in the passage from escaping along the valve stem, it is conventional to provide an annular seal, e.g. a conventional packing, fixed with respect to the valve body and through which the valve stem is snugly reciprocable.

It is known to provide a bellows surrounding the valve stem and extending axially from the valve head to a portion of the valve body adjacent the packing. In this way, even with the valve open, particles or other harmful materials in the fluid passing through the valve body are prevented by the bellows from contacting the valve stem and the packing.

Applicant has found that a metal bellows may be more durable in such service than bellows of rubber or similar materials. Whereas formed metal bellows are known, Applicant has found that a welded metal bellows, for example of the type disclosed in U.S. Pat. No. 3,090,403 to Kroekel, has greater expandability than a formed bellows and tends to have less stress built into it. However, Applicant has also recognized that the relatively thin leaves of such a welded bellows could be damaged, even holed, during compression of such a bellows with a hard particle interposed between adjacent leaves of the bellows.

To avoid the latter problem, Applicant's invention provides additional sealing means between the reciprocable valve head and fixed valve body to substantially prevent fluid, from the main passage in the valve body, from reaching the bellows even with the valve member in its open condition. Moreover, Applicant's same inventive sealing means protects the bellows from water hammer or other shocks caused by implosion, explosion or shocks within the fluid passing through the valve, which shocks may, for example, be due to slamming check valves, etc. nearby in a fluid circuit containing the inventive valve apparatus. In addition, Applicant's inventive sealing means acts as a further backup seal to prevent fluid in the valve passage from contacting, and leaking outward past, the valve stem.

SUMMARY OF THE INVENTION

A valve apparatus comprises a valve body having a fluid passage therein including a valve seat. A valve member is movable in the body between valve open and valve closed positions determined by its proximity to the valve seat. In addition to contacting the valve seat, the valve member is also engagable in sealing relation with a portion of the valve body between the valve seat and valve stem packing, to block fluid in the valve passage from contacting and leaking between the valve stem and packing.

DETAILED DESCRIPTION

The valve apparatus 10 (FIG. 2) comprises a valve body 11 through which extends a fluid passage 12. The valve body includes a valve seat 13 interposed intermediate in the fluid passage, such that closure of the valve seat prevents passage of fluid through the valve body.

Figure 2:
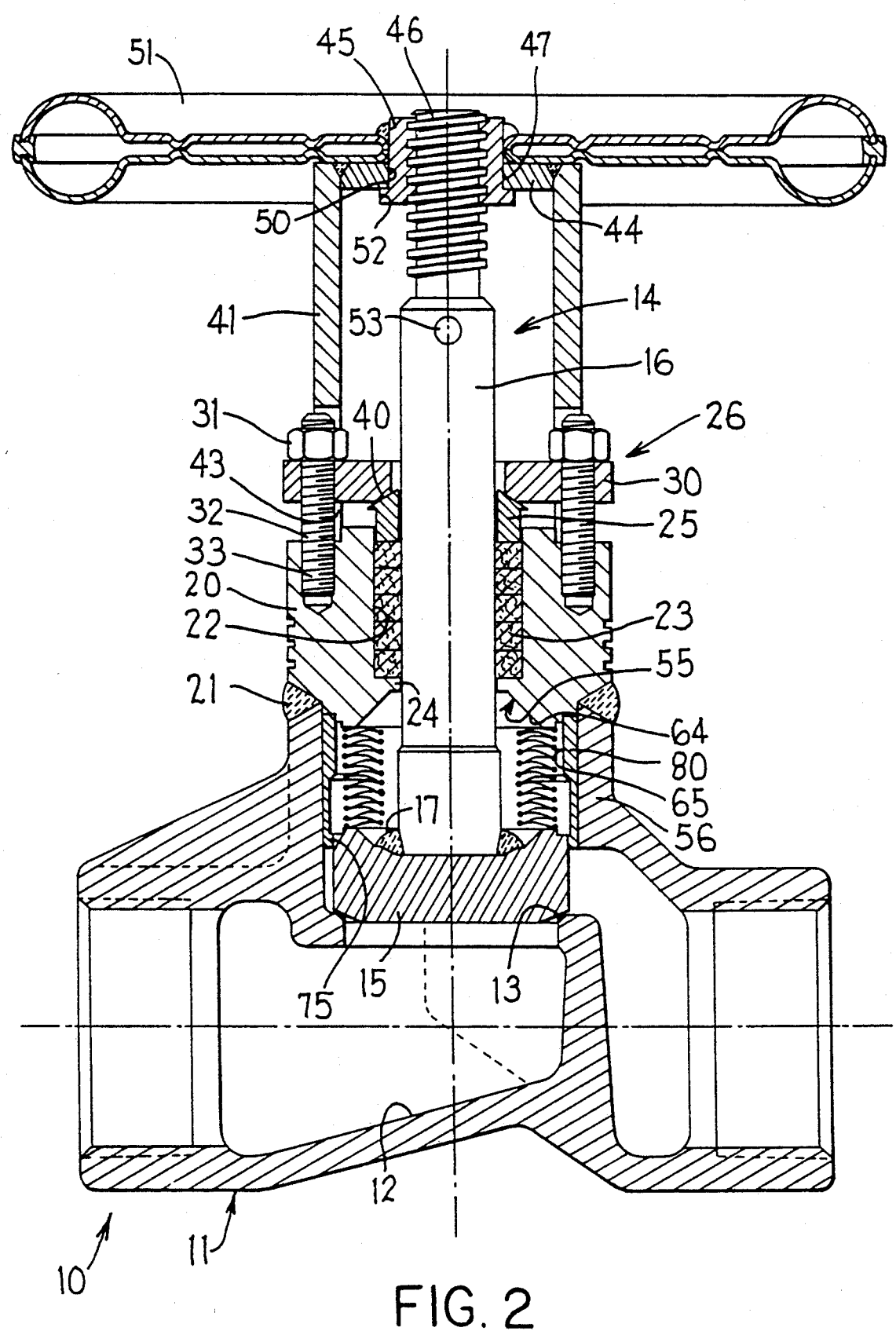
FIG. 2 is a central cross-sectional view substantially taken on the line 2—2 of FIG. 1 and showing the valve in a closed position.
Figure 3:
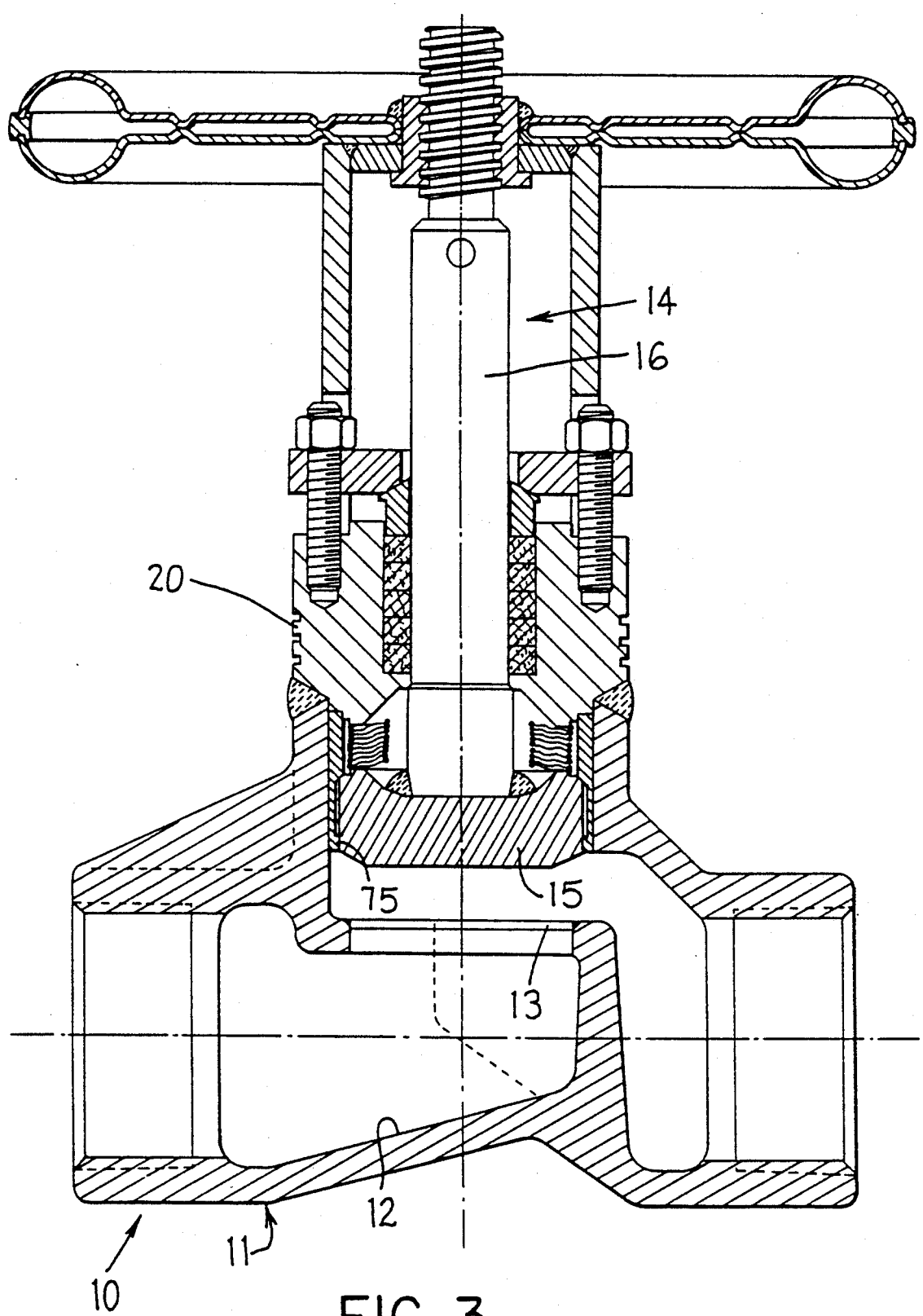
FIG. 3 is a view similar to FIG. 2 but showing the valve in an open position.

A valve member 14 includes a head 15 disposed above and engagable with the seat 13 to close same, as in FIG. 2, and vertically shiftable up off the seat 13 to open same, as in FIG. 3. The valve member 14 further includes a stem 16 fixed to and coaxially extending from the valve head 15 in a direction opposite the seat 13. In the embodiment shown, the head 15 is fixed to the stem 16 by welding 17.

The stem 16 is vertically slidably guided in an upward extension of the valve body 11, namely in a stem guide 20 (FIG. 2). In the embodiment shown, the stem guide 20 is a separate annular member fixed, here by welding 21, to the upper portion of the valve body 11. The stem 16 passes coaxially upwardly through a bore 22 in the stem guide 20. In the embodiment shown, the bore 22 loosely surrounds the stem 16 and the annular space radially therebetween is filled with suitable seal means, in the embodiment shown a conventional packing 23. The packing 23 is supported at its lower end on a radially inward extending flange 24 near the bottom of the guide 20 and which protrudes into the bore 22 to a close slide fit with the stem 16.

A packing compression ring 25 is received downward in the upper end of the bore 22 atop the packing 23. Clamp means 26 are adjustable to press down on the compression ring and thereby vertically compress the packing 23 between the ring 25 and the flange 24 to radially inward expand the packing 23 into snug sealing, but relatively slidable, contact with the stem 16. The clamp means 26 can take a variety of forms. In the particular embodiment shown, the clamp means 26 comprises a compression washer 30 loosely surrounding the stem 16 and pressing down on the compression ring 25 in response to tightening of nuts 31 overlying the washer 30. The nuts 31 are threaded on the upper ends of studs 32 anchored at 33 in the upper end of the stem guide 20 on opposite sides of the stem 16. The studs 32 are radially outboard of the packing 23 and extend up through holes 34 in the washer 30 for receiving corresponding ones of the nuts 31. In the embodiment shown, the interface between the bottom of the washer 30 and the top of the packing compression ring 25 is tapered, as indicated at 40, so that the washer 30 tends to center itself with respect to the packing compression ring 25 as it presses downward thereon.

Figure 1:
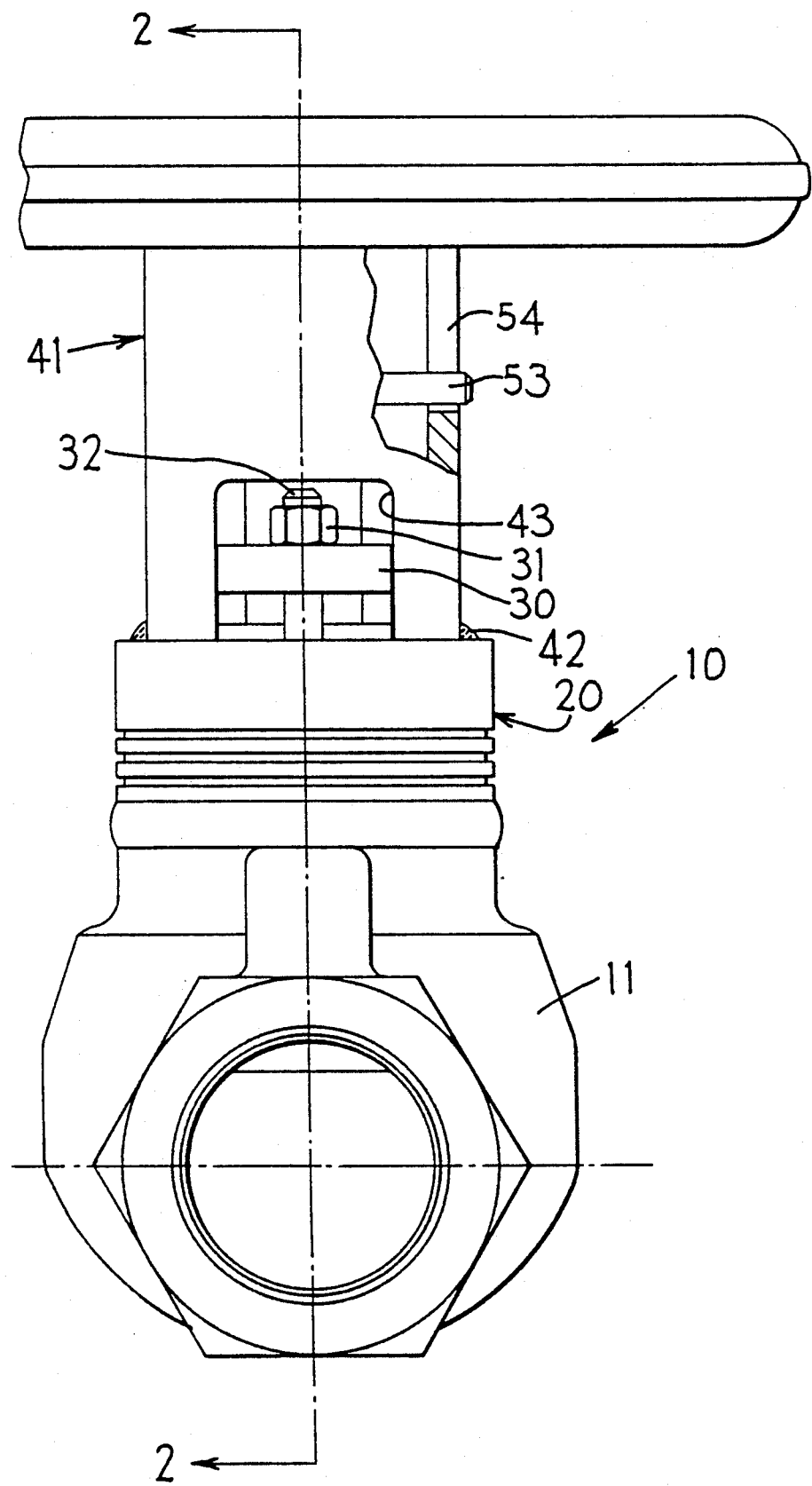
FIG. 1 is a partially broken elevational view of a valve apparatus embodying the invention.

A tubular support 41 is coaxially fixed to and upstands from the top of the stem guide 20 and is affixed thereto by any convenient means such as welding, as indicated at 42 in FIG. 1. Windows 43 in the lower portion of the tubular support 41 allow access to the nuts 31 for tightening same.

The tubular support 41 has a top wall 44 (in FIG. 2) having a central opening 50. A hand wheel 51 has an internally threaded hub 45 welded coaxially therein and located coaxially of the stem guide 20 and stem 16. The upper end of the stem 16 is threaded at 46 and is threadedly received in the hub 45. The hub 45 has a central portion which is rotatably guided in the central opening 50 in the top wall 44. The top wall 44 of the tubular support 41 is vertically sandwiched between hand wheel 51 and a radially outwardly extending flange 52 on the bottom of the hub 45. Thus, the top wall 44 acts as an axial thrust bearing for the hub 45.

Rotation of the hand wheel 51 rotates the internally threaded hub 45 which threadedly lifts and lowers the valve member 14 to open and close the fluid path through the valve seat 13.

To prevent rotation of the valve stem in response to rotation of the hand wheel 51, a pin 53 affixed diametrally in the upper portion of the stem 16, protrudes radially into a vertical slot 54 in the upper portion of the tubular support 41. Thus, the pin 53 slides vertically in the slot 54 as the valve member 14 is raised and lowered by appropriate rotation of the hand wheel 51.

Figure 4:
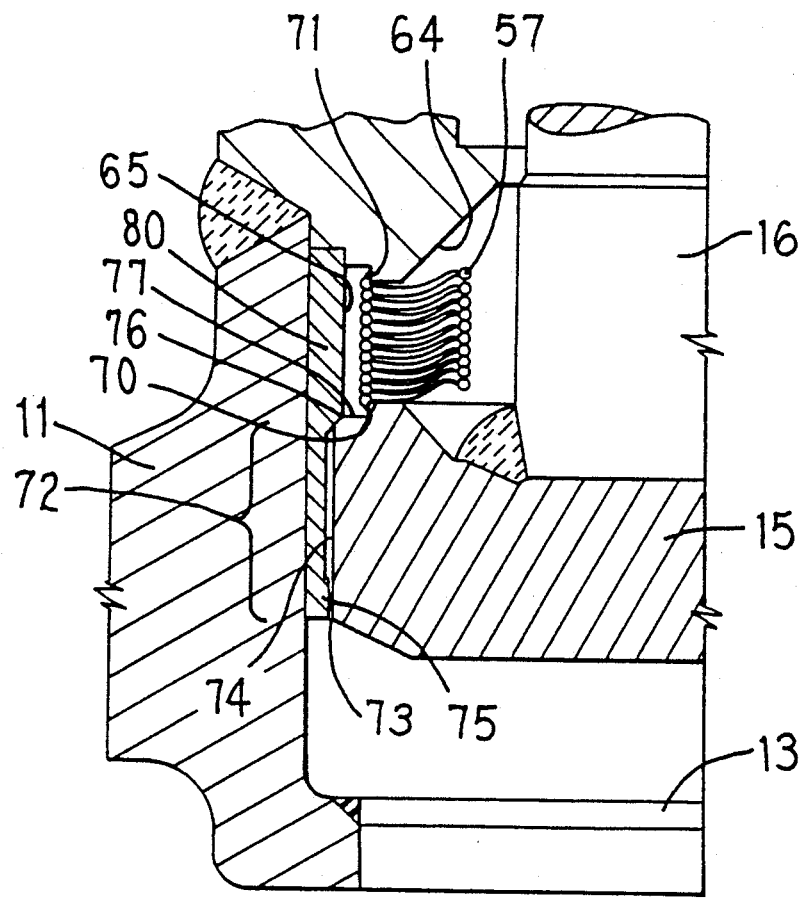
FIG. 4 is an enlarged fragment of FIG. 3.
Figure 5:
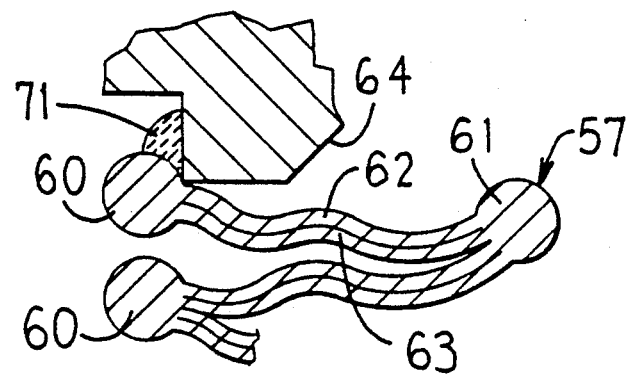
FIG. 5 is an enlarged fragment of FIG. 4.

An annular gallery 55 is defined axially between the bottom of the stem guide 20 and top of the valve head 15 and is defined radially between the valve 16 and the surrounding portion 56 of the valve body 11. Disposed in this gallery 55 is a vertically expansible and contractible bellows 57. As generally indicated in larger scale in FIGS. 4 and 5, the bellows 57 is preferably of the welded steel type illustrated, for example, in above-mentioned Kroekel U.S. Pat. No. 3,090,403. Such bellows is comprised of a vertically stacked series of radially inner, annular weld beads 60 and corresponding radially outer annular weld beads 61 (FIG. 5). Each pair of inner and outer weld beads are connected by two vertically adjacent, annular, relatively thin metal sheet portions 62 and 63, somewhat curved in cross section. The result is a highly flexible double wall bellows capable of expansion and contraction over a substantial axial range, sufficient to easily assume the valve open and valved closed positions of FIGS. 3 and 2 respectively. The opposite ends of the bellows 57 are conveniently fixed, as by welding, in a fluid tight continuous circumferential manner, at the bottom to the top of the valve head 15 and at the top to the bottom of the stem guide 20 by welds indicated at 70 and 71 in FIG. 4. The bellows 57 divides the gallery 55 into first and second compartments 64 and 65. The first compartment 64 lies between the valve stem 16 and bellows 57 and thus is a sealed compartment.

During opening of the valve, the upward rise of the valve head 15 reduces the volume of the compartment 64 and thus tends to increase the pressure of air therein. This increase in air pressure takes place gradually since some time is required to fully open the valve (a number of turns of the hand wheel 51 being required to do so). While some of this pressure increase may be accommodated by outward flexing of the bellows 57, and a portion of this pressure increase may be lost by minor leakage gradually between the packing 23 and stem 16, the mechanical advantage provided by the upper threaded end 46 of the stem 16, coacting with the threaded hub 45 of the hand wheel 51, permits the full opening of the valve despite a pressure increase in the compartment 64 in consequence of that compartment's reduction and volume.

The same comments in reverse apply to the increase in volume and possible reduction in air pressure in the first compartment 64 resulting from downward movement of the valve head from its FIG. 3 open position to its FIG. 2 closed position.

The valve head 15 and adjacent parts of the valve body 11 (including the seat 13) are conveniently circular.

To the extent above-described, the structure shown in the drawings is conventional.

Turning now to a structure more specifically including the present invention, seal means 72 (FIG. 4) provide sealing between the valve head 15 and surrounding portion of the body 11 throughout the vertical range of positions, from full open to full closed, of the valve head 15. Such seal means protect the bellows 57 against abrasion caused by particles contained in the fluid in the fluid passage 12, protect the bellows 57 against puncture by dirt and particles getting between the leaves (metal sheet portions) 62,63 of the bellows, and protect the bellows 57 from water hammer or other shocks caused by implosion, explosion or shocks within the fluid in the fluid passage 12 of the body 11 (as might be caused for example by slamming check valve nearby a fluid circuit containing the valve apparatus 10). The seal means 72 also provides a backup seal to further guard against fluid in the passage 12 from leaking through a damaged bellows 57 and a damaged packing 23, thence upward past the stem 16.

In the preferred embodiment shown, the seal means 72 comprises a sliding seal 73 (FIG. 4) between the valve body 11 and the perimeter of the valve head 15. The sliding seal 73 is effective during the entire range of opening and closing movement of the head 15 with respect to the body 11. More particularly, in the specific embodiment shown, the sliding seal 73 is formed by and between the cylindrical perimeter 74 of the valve head 15 and an annular flange 75 fixed within the valve body 11 at the bottom of the gallery 55. The annular flange 75 is vertically spaced above the seat 13 and protrudes radially inward into close sliding clearance relation with the valve head 15. The annular flange 75 is positioned vertically to engage the top perimeter portion of the valve head 15 in the valve closed position (FIG. 2) and to engage the lower perimeter portion of the valve head 15 in the valve open position (FIG. 3).

The close clearance between the annular flange 75 and the perimeter of the valve head 15 is maintained during the full range of opening and closing movement of the valve head 15 with respect to the body 11. In the embodiment shown, sealing between the valve head perimeter 74 and annular flange 75 is effected by maintaining only a small radial clearance gap (preferably 0.004 inch therebetween). This relatively small clearance gap prevents particles in the fluid in the passage 12 from reaching the bellows 57.

The sealing means 72 further includes a poppit-like seal, namely a positive closure seal, between opposed annular surfaces 76 and 77 of the valve head 15 and valve body 11, respectively. In the embodiment shown, the opposed, positively engaging surfaces 76 and 77 are correspondingly sloped to provide a wedging effect as the valve head 15 reaches its uppermost position, to thereby assure a very tight seal between the surfaces 76 and 77.

In the embodiment shown, the annular flange 75 and surface 77, fixed with respect to the valve body 11, are provided on a separate ring 80 which is fixed, for example by a press fit, within the upper portion of the valve body 11. Accordingly, with the valve head 15 in its fully open position of FIGS. 3 and 4, the bellows 57 are doubly protected against contact with particles from the fluid passage 12, namely by the sliding seal at 73 and by the poppit-like seal effected by the engaging surfaces 76,77. Thus, the second compartment 65, outside the bellows 57, is sealed against incursion of particles from the fluid passage 12 continuously at 73 and further, in the open position of the valve, at 76,77.

While it is contemplated that a resilient, e.g. rubber-like, face may be applied to one or more of the seal elements 74, 75, 76 and 77, it has been found satisfactory, in units constructed according to the invention, simply to use the unadorned rigid surfaces of the ring 80 and valve head 15.

The apparatus 10 can be assembled in a conventional manner, namely by preassembling the components 14–20 and 22–54 separately from the the valve body 11 and the ring 80 fixed in the top of the valve body 11. The bellows 57, can then be easily welded to the stem guide 20 and valve head 15. Then, the resulting unit 14–20 and 22–57 can be fixed to the top of the valve body 11 by the welding at 21. This completes assembly of the valve apparatus 20.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A valve apparatus suitable for controlling the flow of a fluid containing hard and/or sharp particles, and comprising:
    a valve body having a fluid passage therethrough, the fluid passage including a valve seat;
    a valve member movable in said valve body from a valve closed position engaging said valve seat to a valve open position spaced from said valve seat, said valve body including a gallery in which said valve member is movable;
    a bellows fixed adjacent one end with respect to the valve member and fixed adjacent its other end with respect to the valve body, the bellows being housed loosely in said gallery, said bellows preventing fluid communication between portions of said gallery respectively close to and remote from said valve seat, said bellows having leaves movable close to each other by opening movement of said valve member and damageable by particles have a selected size entering between adjacent leaves thereof;
    protective means coactive between said valve body and valve member for protecting the bellows from foreign particles in fluid in said passage and from mechanical shock in all positions of said valve member, said protective means comprising:
    first coactive means, mounted with respect to said valve member and valve body and maintaining a clearance gap therebetween in relative positions thereof between said valve open and valve closed positions, (1) for preventing particles above said selected size from passing from said fluid passage into spaces between leaves of said bellows and (2) for limiting fluid flow therethrough sufficient to avoid bellows damage by a water hammer, said gap corresponding in width to said selected particle size, yet (3) for allowing some fluid flow through said gap at all times, and
    second coactive means mounted with respect to said valve member and valve body for defining a positive closure seal therebetween in said valve open position,
    said first coactive means defining a cylindrical peripheral portion on said valve member across said gap from a radially inward extending flange on said valve body and axially slidable therepast during opening and closing movement of said valve member, said second coactive means comprising axially opposed poppit surfaces on said valve member and valve body positively engageable at the full open valve position to positively block fluid leakage therepast toward said bellows, and
    means defining an axially extending annular space radially between said valve member and valve body and axially separating said radially inward extending flange from said poppit surface of said valve body, the radial width of said annular space being greater than said clearance gap, so that any particles being small enough to pass through the clearance gap form the fluid passage of the valve into said annular space will be contained loosely in said annular space and thereby not effective to jam the valve member with respect to the valve body, thereby preventing binding of said valve member during the opening and closing of said valve member, said particles in said annular space being trapped therein when the valve member fully opens by a selected axial distance.

2. The apparatus of claim 1 in which said gap is about 0.004 inch wide in radial extent.

3. The apparatus of claim 1 in which said valve body is lined by a tubular insert incorporating said radial flange and said poppit surface of said valve body and further having an axially elongate annular recess therebetween defining said axially elongate annular space.

4. The apparatus of claim 1 in which said axially opposed poppit surfaces are correspondingly sloped to provide a wedging effect as the valve member reaches said open position and therewith providing a tight seal against fluid from said passage into contact with said bellows even if said valve is left in its open position for an extended time.

5. The apparatus of claim 1 including an external actuator coupled to said valve member and actuable outside said valve body for opening and closing said valve apparatus.

6. The apparatus of claim 1 in which said flange and said poppit surfaces are rigid.

* * * * *

UNITED STATES PATENT AND TRADEMARK OFFICE
CERTIFICATE OF CORRECTION

PATENT NO. : 5 056 759

DATED : October 15, 1991

INVENTOR(S) : Ronald D. Schlesch

It is certified that error appears in the above-identified patent and that said Letters Patent is hereby corrected as shown below:

Column 5, line 56; change "have" to ---above---.

Column 6, line 34; change "form" to ---from---.

Signed and Sealed this

Twenty-second Day of June, 1993

Attest:

MICHAEL K. KIRK

*Attesting Officer*    *Acting Commissioner of Patents and Trademarks*